July 8, 1924. 1,500,658
J. M. STRMIC
FEED GAUGE FOR PRINTING PRESSES
Original Filed Sept. 5, 1918
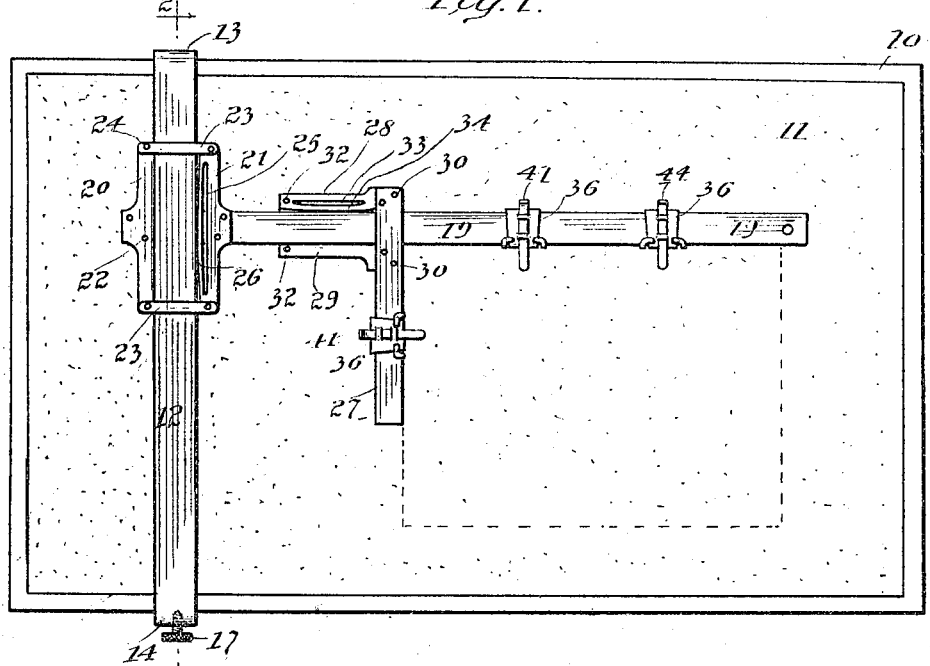
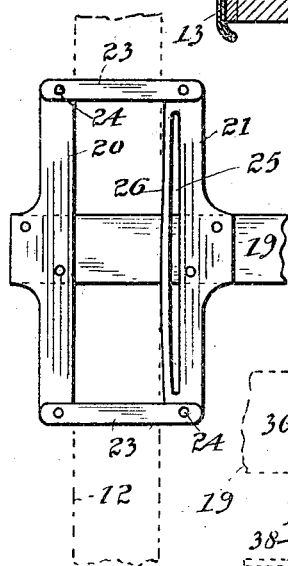
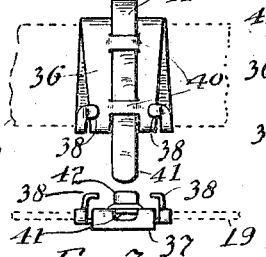
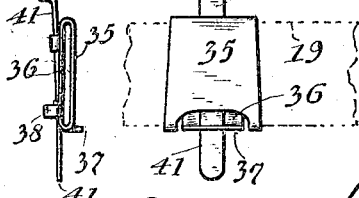

Patented July 8, 1924.

1,500,658

UNITED STATES PATENT OFFICE.

JOHN M. STRMIC, OF CHICAGO, ILLINOIS.

FEED GAUGE FOR PRINTING PRESSES.

Application filed September 5, 1918, Serial No. 252,745. Renewed December 10, 1923.

*To all whom it may concern:*

Be it known that I, JOHN M. STRMIC, citizen of the United States, and resident of the city of Chicago, in the county of Cook and State of Illinois, have invented certain new and useful Improvements in Feed Gauges for Printing Presses, of which the following is a full, clear, and exact specification.

This invention relates to improvements in feed gauges for printing presses determining the position of the sheet on the platen with reference to the location and alignment of the printing matter in the chase, and especially for the purpose of job printing presses wherein there is frequently a substantial variance in the dimensions of the set up printed matter and the sheets to be printed upon and the location of the printed matter thereon, and with the result that as many different adjustments of the feed gauge is required in determining the position of the sheets on the platen for securing their proper location relative to the printed matter. Before my invention the feed gauges commonly employed have been more or less objectionable owing to the number of pieces of which they have been constructed; their use of several separately formed springs for preventing lateral movement of the gauge arms with reference to each other and to their gauge bar; and the number of adjustable screws for securing their arms to their respective support and their gauge bar and to the platen, in their operative position; the cost of their construction and liability to get out of order; the cost of repairs; and particularly the expenditure of time for attaching and detaching the supporting bar from the platen; for securing the perfect adjustment of the gauge and especially when the printing matter is out of alignment with the chase.

My invention has for its objects, among other things, a substantial reduction of the number of parts of a feed gauge for printing presses; the time required for adjusting the gauge arms, with reference to each other and their gauge bar; the dispensing with springs separated therefrom, and with a plurality of screws for securing them in their operative position; and to have the support bar so constructed, that by the use of but a single thumb-screw the bar may be secured and adjusted to the platen in its operative position with reference to the printing matter in the chase, both when in, or out of alignment with the latter.

A further object of my invention is to provide stops for the gauge arms, bent from a single piece of metal, slidable adjustably thereon, consisting of a fixed jaw, and a yielding jaw terminating at its free end in a foot opposing the edges of the paper to be printed upon, which foot is limited in its movement away from the fixed jaw by lugs bent from the material of the latter, and provided with loops formed therefrom adapted for frictionally retaining a blade adjustably therein, for preventing the printing matter from lifting the sheets substantially above their operative position on the tympan sheet of the platen.

With these ends in view, my invention finds its embodiment in certain features of novelty in construction, combination, and arrangement of parts, by which said objects and certain other objects are attained, all as hereinafter fully described with reference to accompanying drawing, and more particularly pointed out in the claims.

In said drawing:

Fig. 1 illustrates a top plan view of the feed gauge in which my invention finds its embodiment in its operative position upon a bed plate and over the tympan thereof.

Fig. 2 is a transverse section taken on the line 2—2 of Fig. 1.

Fig. 3 is a bottom detailed plan view of the means slidably connecting the longer gauge arm with the gauge bar therefor.

Fig. 4 is a similar view in detail showing the slidable connection between the shorter and longer arms.

Fig. 5 is a detailed plan view of the slidably adjustable stops for the gauge arms.

Fig. 6 is a similar view thereof showing the blade therefor in its operative position.

Fig. 7 is a front end elevation of the stop.

Fig. 8 is a side elevation thereof, and

Fig. 9 is a bottom plan view of one of the stops.

Similar character of references indicate the same parts in several figures of the drawing.

10 indicates the platen of the printing press and 11 the tympan sheet secured to the platen in the usual manner.

Extending over the tympan sheet is a gauge bar 12 which constitutes the support for the gauge arms hereinafter described, one end of which bar is provided with a hook 13 bent therefrom, and the other end, likewise with a flange 14, and preferably by bending the metal of the bar upon itself, as indicated at 15—15, for providing a space 16 between the bar and the platen, and to make rigid the hook end portion of the support.

Gauge bar 12 is secured in its operative position by means of a thumb-screw 17 projecting through a screw-threaded perforation in the flange 14, which screw preferably pointed at its end, as indicated at 18, to provide a means for shifting the gauge bar to alignment with the printed matter in a chase, when out of alignment with the sides of the chase, and therefore with the platen.

Extending at a right angle to the gauge bar 12 is a gauge arm 19 on one end of which is an open frame consisting of spaced side bars 20 and 21 rigidly secured to the gauge arm 19 by means of rivets 22, or other suitable means, and connected at their ends by cross bars 23—23 extending across the upper surface and secured thereto, by means of rivets 24—24 or other suitable means.

This open frame constitutes and provides for a sliding connection of gauge arm 19 upon the gauge bar 12 and at the same time a means for disconnecting the gauge arm 19 from the gauge bar for packing and shipping purposes, as may be, by removing screw 17 followed by sliding the bar 19 until it contacts with the flange 14 when by holding the gauge arm in the hand and swinging the bar 12 the latter may be disconnected from the open frame.

As a means for frictionally tightening the gauge arm 19 upon its support 12 the bar 21 of the frame is provided longitudinally with a slot 25 providing between the slot and the bar 12 a somewhat narrow strip of metal 26 which when bent on a curve away from the slot, operates to frictionally yieldingly prevent the gauge arm from vibrating laterally with reference to the gauge bar, at a right angle thereto.

The advantage of this yielding connection between the gauge arm and its gauge bar is, that it not only dispenses with the heretofore necessity of using springs and screws separately from and attached for tightening the gauge bar in its adjusted position upon the supporting bar, but that the tension of a spring so constructed may be adjusted and loss of tension from use and wear be quickly supplied by projecting through the slot a point of a screw-driver, a knife, or even a nail, operating the same as a lever, bending the strip 26 inwardly until its tension is sufficient for the securing the desired lightness of the fit of the side bars of the frame against the edges of the gauge bar.

Extending across the upper surface of the gauge arm 19 and at right angle thereto is another and shorter gauge arm 27 which is likewise provided with an open frame consisting of side bars 28 and 29 secured to the under side of the gauge arm 27 by means of rivets 30, or other suitable means, and connected on their under side at their opposite ends by means of a cross bar 31, secured to the side bars 28 and 29 by rivets 32 or other suitable means.

The side bar 28 being provided longitudinally with a slot 33 to provide for an inwardly curved spring 34, constructed and operating as before described in connection with the gauge arm 19 for preventing the lateral movement of the shorter gauge arm 27 in its adjusted operative position on the gauge arm 19.

For adjusting the gauge arm to the matter to be printed upon the tympan sheet the gauge bar 12 is secured to the platen, as indicated in the drawings, at a suitable distance from the printed matter, for the adjustment thereto of the gauge bars 19 and 27, whereupon the gauge arm 19 is adjusted as usual to the side of the printed matter adjacent thereto, followed by adjustment of gauge arm 27 and stops to and along printed matter opposed thereto.

When, however, either before or after the attempted adjustment of the gauge arms to the printed matter, the printed matter is found to be out of alignment with the platen, the thumb-screw 17 is loosened sufficiently to swing the supporting gauge bar from its opposite end to a position parallel to the adjacent side of the printed matter, and until perfectly aligned therewith and for adjusting gauge arms to the sides of the printed matter respectively adjacent thereto.

In other words, it is now apparent that my invention provides for the use of but a single screw for removably securing the gauge bar, for the gauge arms, in its operative position in alignment with the printed matter, both when such printed matter is in or out of alignment with the sides of the chase and with the platen, and also for slidingly adjusting the gauge arms and maintain them from lateral vibration, without the use of screws and separate springs attached to either of the gauge arms.

It is the desirable practice to provide each gauge bar with one or more stops for preventing the edges of the sheets to be printed upon from passing beyond the inner edges of these bars, having a rigid jaw and a yielding jaw slidably mounted upon the gauge bars, but as heretofore with the absence of any means for limiting the movement of the yielding jaw away from the fixed jaw with the result that the tension of the yielding jaw is in detaching the stops from these bars frequently weakened and the jaws otherwise injured, and at best must be readjusted before capable of being successfully operated.

My invention, however, among other things, also provides for the construction of a stop, slidable upon and frictionally held upon for the adjustment upon the gauge arms formed from a single piece of metal and so constructed that a yielding jaw, extended to form a foot, is limited in its movement away from the fixed jaw and which is also so constructed as to provide a means for an adjustable blade frictionally held and supported from said jaw.

The stops above referred to embodying my invention, as shown in Figs. 1 and 5 to 9 inclusive, are constructed from a single piece of somewhat thin and flexible metal bent upon itself to form a substantially rigid jaw 35 adapted to embrace the under side of the gauge bars and a flexible jaw having a foot 37 depending therefrom to direct and yielding contact with the tympan sheet on the platen which jaws in side elevation have the elongated O-shaped form, as indicated in side elevation in Fig. 8 and as a result of which the foot 37 ultimately adjusts itself to such contact when for any reason the gauge bars or either of them may be out of parallel from bending or other cause with the surface of the tympan sheet and which not unfrequently occurs owing to the fact when, as is usual, the gauge bar and gauge arms are made of somewhat thin sheet steel or other metal.

As a means for limiting the movement of the yielding jaw away from the fixed jaw the fixed jaw is somewhat wider next to the free end of the yielding jaw and is provided, towards its outer edges, with lugs projecting upwardly therefrom and bent inwardly over and in the path of movement of the yielding jaw so that while the yielding jaw may be moved away from the fixed jaw until the bottom edge of the foot is in a plane substantially that of the under surface of the fixed jaw, the yielding jaw can move no further in that direction, or to a position reducing its resiliency to an undesirable degree, or preventing the foot from automatically moving to direct contact with the surface of the tympan sheet, or the jaws from co-operating with each other for clamping them slidably upon the gauge bars against being accidentally moved from their adjusted position thereon.

It will not be observed that the movable jaw is provided with space holes 39—39 but preferably (see Fig. 5) with separate loops 40—40 each of which may however be formed by transverse slits through the edge, movable as shown in Fig. 6, for frictionally holding a blade 41 substantially longer than either jaw of the stop and upturned at its outer end, as indicated at 42, Figs. 5 and 6, and preferably slightly curved upwardly at its inner end which projects over the edges of the sheets opposed by the foot 37. The blade is adjustable lengthwise over the sheets to be printed upon to prevent their adherence to the printing matter from carrying them away from the tympan sheet, and at the same time provide a means indicating that the sheet is in its proper position before the printing takes place.

The blade 41 is adjustable towards and from the sheet to be printed upon in order that it may be cleared by the printing matter moving to its printing position on the sheet.

Having described my invention what I claim and desire to secure by Letters Patent is:

1. A device for the purpose described comprising in combination a gauge bar, the ends of which are of a thickness spacing the intermediate portion of the gauge bar from the platen and project at an angle adapting said ends to embrace the edges of the platen of a printing press, and a screw for tightly clamping the gauge bar in its operative position to the platen.

2. A device for the purpose described comprising in combination a gauge bar formed from a strip of metal having the end portions thereof doubled upon the inner sides thereof for strengthening the same and providing a space between the bar and the platen, said thickened end portions extending at an angle adapting them to extend across the edges of the platen, and a pointed set-screw passing through one of said ends for adjusting the gauge bar while it is operatively tightened to the platen.

3. A device for the purpose described, comprising in combination a gauge bar the end portions of which provide for a space between the bar and the platen and project at an angle opposing the edges of the platen, one of which ends also projects in a plane beneath the platen, and a set-screw for adjustably tightening the gauge bar to the platen, having a pointed end impinging against the edge of the platen and providing a means by which when the gauge bar is out of alinement, it may in its tightened position be shifted to alinement with the platen and the printed matter of a chase supported thereon.

4. A device for the purposes described comprising in combination, a gauge bar the ends of which are bent at an angle and adapted to embrace the edge of the platen of a printing press, a thumb-screw passing through one of said ends adapted to engage with the platen for securing the gauge bar in its operative position thereon, and a gauge arm, having smooth edges, extending at right angle to and having an open frame fixed to one end thereof slidable upon the gauge bar and provided with a curved spring formed therefrom and adapted to frictionally resist a force tending to laterally vibrate the arm with reference to the bar.

5. A device for the purposes described comprising in combination, a gauge bar, means for securing said gauge bar in its operative position to the platen of a printing press in a plane parallel with and above the tympan paper on the platen, means for locking the gauge bar in its adjusted operative position to the edges of the platen, an open frame fixed to the gauge arm and slidable upon the gauge bar having a longitudinal slit one side wall of which is curved and operates as a spring adapted to embrace and frictionally tighten the gauge arm upon the edges of the gauge bar for maintaining the gauge arm against lateral vibration relative to the gauge bar.

6. A device for the purposes described comprising in combination, a gauge bar bent at both ends adapted to embrace the opposite edges of the platen on a printing press, a thumb-screw passing through one of said ends and adapted to engage the opposing edge of the platen and detachably locking the gauge bar in its operative position thereon, a gauge arm terminating in an open extension adjustably slidable on the gauge bar, a curved spring formed integrally with said extension adapted to frictionally engage and tighten the gauge arm against the edges of the gauge bar, another gauge arm extending along a line parallel with a gauge bar having an open extension slidably connecting it with the first mentioned gauge arm, provided with a slot one wall of which forms a curved spring adapted to engage and frictionally connect said gauge arms.

7. In a feed gauge for printing presses, the combination with a gauge arm of a slidably adjustable stop for said arm, provided with a rigid jaw and a flexible jaw formed from a single sheet of metal, said rigid jaw being provided with lugs projecting over and limiting the movement of the flexible jaw and also with a foot projecting from the flexible jaw adapted to yieldingly contact with the tympan sheet of a printing press.

8. A device for the purposes described comprising in combination, a gauge bar, means for removably securing said gauge bar in its operative position to the edges of the platen of a printing press and in a plane above the tympan sheet therefor, a gauge arm extending at a right angle to the gauge bar and slidable thereon, means for preventing the gauge arm from vibrating laterally, another gauge arm extending at a right angle to and slidable upon the first named gauge arm, means for preventing the lateral movement of the second mentioned gauge arm, stops adjustably slidable on said arms provided with a yielding jaw, a foot therefor projecting across the opposing edges of the sheets to be printed upon and to yielding contact with the tympan sheet, angular lugs projecting from the fixed jaw overhanging and limiting the movements of the yielding jaw which several devices constituting the stop are formed from a single sheet of resilient sheet metal.

9. A device for the purposes described comprising in combination, a gauge arm, a stop slidably adjustable thereon consisting of a fixed jaw, a yielding jaw, bent from a single sheet of metal, said yielding jaw having a plurality of loops formed therefrom, and an adjustable blade projecting through and frictionally retained by said loops.

In witness whereof, I have hereunto set my hand and affixed my seal, this 31st day of August A. D. 1918.

JOHN M. STRMIC. [L. S.]

Witnesses:
C. M. STUMCKE,
JNO. G. ELLIOTT.